(12) United States Patent
Collins

(10) Patent No.: US 6,776,376 B2
(45) Date of Patent: Aug. 17, 2004

(54) FLIGHT CONTROL SURFACE ACTUATION SYSTEM

(75) Inventor: Andrew J. Collins, North Somerset (GB)

(73) Assignee: Hamilton Sunstrand, Windsor, CT (US)

( * ) Notice: Subject to any disclaimer, the term of this patent is extended or adjusted under 35 U.S.C. 154(b) by 0 days.

(21) Appl. No.: 10/274,024

(22) Filed: Oct. 18, 2002

(65) Prior Publication Data

US 2004/0075019 A1 Apr. 22, 2004

(51) Int. Cl.[7] .................................................. B64C 9/02
(52) U.S. Cl. ..................................... 244/213; 244/75 R
(58) Field of Search ................................ 244/214, 215, 244/213, 201, 75 R

(56) References Cited

U.S. PATENT DOCUMENTS

| | | |
|---|---|---|
| 3,617,848 A | 11/1971 | Friday et al. |
| 3,742,325 A | 6/1973 | Andresen et al. |
| 3,785,596 A | 1/1974 | Chinchester-Miles |
| 4,032,094 A | 6/1977 | Morgan et al. |
| 4,035,705 A | 7/1977 | Miller |
| 4,063,140 A | 12/1977 | Kammerer et al. |
| 4,079,902 A | 3/1978 | Ryzhko et al. |
| 4,103,848 A | 8/1978 | Johnson et al. |
| 4,115,847 A | 9/1978 | Osder |
| 4,162,438 A | 7/1979 | Osder |
| 4,330,743 A | 5/1982 | Glennon |
| 4,345,195 A | 8/1982 | Griffith et al. |
| 4,453,114 A | 6/1984 | Nordlund |
| 4,470,569 A * | 9/1984 | Shaffer et al. ............... 244/214 |
| 4,598,888 A | 7/1986 | Beteille |
| 5,059,882 A | 10/1991 | Marcillat et al. |
| 5,096,144 A * | 3/1992 | Fishwick ................ 244/110 D |
| 5,150,861 A | 9/1992 | Merkel |
| 5,367,237 A | 11/1994 | Ring et al. |
| 5,458,304 A | 10/1995 | Gilbert |
| 5,538,202 A * | 7/1996 | Thornburg .................. 244/215 |
| 5,570,859 A | 11/1996 | Quandt |
| 5,676,333 A | 10/1997 | Rethorst |
| 5,711,496 A * | 1/1998 | Nusbaum ..................... 244/214 |
| 5,735,490 A | 4/1998 | Berthet et al. |
| 5,797,564 A | 8/1998 | Cartmell et al. |
| 5,803,409 A | 9/1998 | Keefe |
| 5,836,550 A * | 11/1998 | Paez .......................... 244/214 |
| 5,839,698 A * | 11/1998 | Moppert ..................... 244/217 |
| 5,868,359 A | 2/1999 | Cartmell et al. |
| 6,179,248 B1 | 1/2001 | Putman et al. |
| 6,209,825 B1 * | 4/2001 | Scott .......................... 244/226 |
| 6,237,433 B1 | 5/2001 | Rodrigues |
| 6,296,202 B1 * | 10/2001 | Stanek ....................... 244/1 N |
| 6,474,184 B2 * | 11/2002 | Janker ........................ 74/99 R |

FOREIGN PATENT DOCUMENTS

WO    WO99/65768    12/1999

* cited by examiner

Primary Examiner—Robert P. Swiatek
Assistant Examiner—Timothy D. Collins
(74) Attorney, Agent, or Firm—Carlson, Gaskey & Olds

(57) ABSTRACT

A flight control surface actuation system has a plurality of actuators attached to one or more summing levers. Each summing lever has an actuator output point that is attached to the flight control surface. The summing lever position corresponds with a sum of the positions of the actuators attached to it. If one of the actuators jams and becomes immovable, other actuators attached to the same summing lever as the malfunctioning actuator compensates for the malfunctioning actuator to bring the flight control surface to a neutral position. The summing lever makes it possible for flight control surface actuation systems to use actuators other than actuators having a bypass mode or any other features that prevent the actuators from jamming.

11 Claims, 2 Drawing Sheets

FLIGHT CONTROL SURFACE ACTUATION SYSTEM

TECHNICAL FIELD

The present invention is directed to controlling flight control surfaces in aircraft, and more particularly to an actuator system that controls the position of a flight control surface.

BACKGROUND OF THE INVENTION

Control over aircraft flight control surfaces is critical to proper steering of the aircraft. Hydraulic actuators have long been used to modify the positions of flight control surfaces. Most systems couple each flight control surface with multiple actuators so that an operator can still control the surface, and therefore maintain safe control over the aircraft, even if one of the actuators fail.

As is known in the art, hydraulic actuators can be disabled if a malfunction is detected. To preserve flight control surface control, the malfunctioning hydraulic actuator can be put into a bypass mode where the actuator moves freely as the remaining actuators in the control system continue to move the flight control surface. The malfunctioning actuator is then driven by the remaining operational actuators.

Other types of actuators, however, may have structures that prevent any movement of the actuator during a malfunction, such as a jam or hardover failure. For example, actuators that are built with geared elements may lock the actuator into an undesired position if debris enters the actuator or if components within the actuator move out of their proper alignments. Because malfunctions in other types of actuators may lock the actuator into a position during malfunction, the remaining actuators cannot move the flight control surface to compensate for the malfunction. Further, some actuator types do not have a bypass mode that allows the actuator to be driven or otherwise movable during malfunction because it is not possible to dislodge the malfunctioning actuator from its locked position. The malfunctioning actuator therefore causes the flight control surface to seize. If the flight control surface seizes in a position other than in a neutral position, the aircraft may be difficult to handle. As a result, only limited types of actuators are considered appropriate for controlling flight control surfaces.

There is a desire for a flight control surface control system that can accommodate different types of actuators even if they lock up during malfunction.

SUMMARY OF THE INVENTION

The present invention is directed to a flight control surface actuation system having a plurality of actuators attached to one or more levers so that the lever orientation dictates the flight control surface position.

In one example, each lever is attached to the flight control surface at an actuator output point on the lever. The lever orientation dictates the position of the flight control surface and corresponds with a sum of the positions of the actuators attached to it. Thus, the flight control surface position is controlled by the lever position rather than directly via the actuator position.

If one of the actuators malfunctions in a way that locks the actuator in a certain position, the inventive system can still move the flight control surface by moving other actuators attached to the same lever as the malfunctioning actuator to compensate. Thus, the flight control surface can always be moved to a safe, neutral position even if a malfunctioning actuator locks in an extreme extended or retracted position. The lever makes it possible for flight control surface actuation systems to use a wider variety of actuators, including actuators that do not have a bypass mode.

DETAILED DESCRIPTION OF THE EMBODIMENTS

Figure 1:
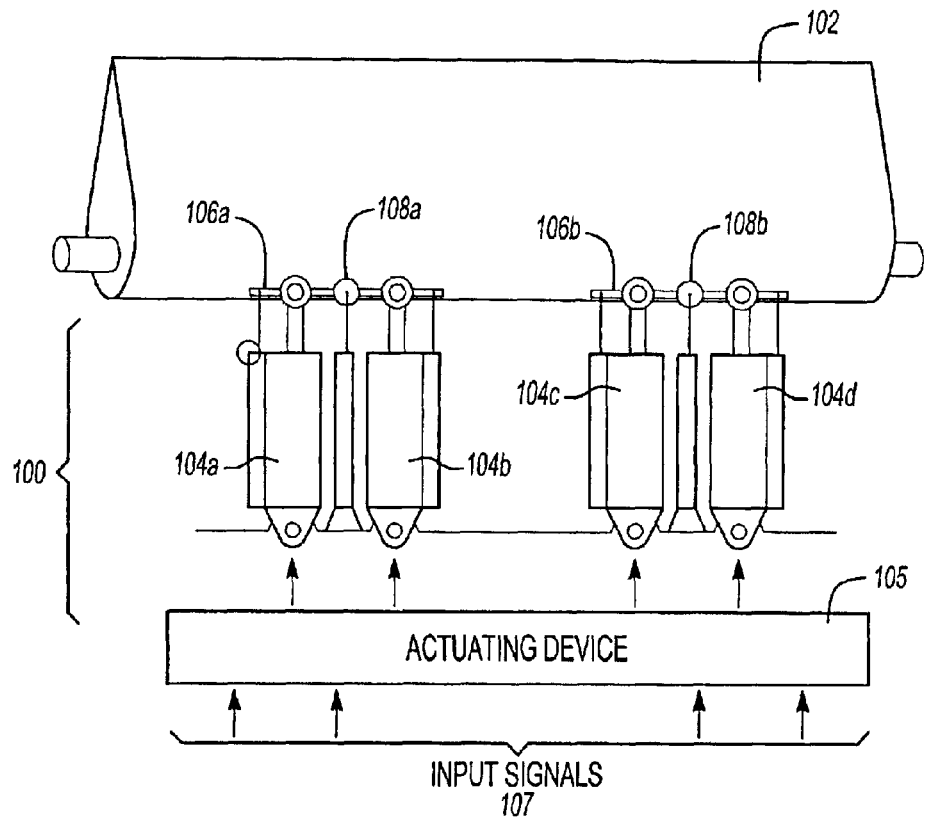
FIG. 1 is a schematic representative diagram of a flight control surface actuation system according to one embodiment of the invention.

Referring to FIG. 1, one embodiment of the inventive actuator system 100 controls a pivotable flight control surface 102, such as an aileron, rudder, roll spoiler, elevator, etc. in an aircraft. The flight control surface 102 moves about a pivot axis to various pivot positions. In FIGS. 1 and 3, the flight control surface 102 is shown in a neutral position, while in FIG. 2, the flight control surface 102 is shown in an extended position. The actuator system 100 includes a plurality of actuators 104a, 104b, 104c and 104d connected to an actuation device 105 that controls the position and operation of each actuator 104a–d via input signals 107. In one example, the actuation device 105 comprises a suitably-programmed commercially available microprocessor. The actuators 104a–d themselves can be controlled by the actuation device 105 via any known manner, such as through motor control units.

In one embodiment, the actuators 104a–d are actuatable to have three positions: an extended position, a neutral position, and a retracted position. These three positions correspond to extended, neutral and retracted positions of the control surface 102. In FIG. 1, for example, all of the actuators 104a–d are shown in a neutral position that corresponds to the neutral position of the flight control surface 102. Note that the neutral position for the actuator 104a–d can be any position in between the extreme extended and extreme retracted positions and does not have to occur in the exact middle of the actuator's operational range. The extended position can be any position that extends the actuators 104a–d forward past the neutral position. Similarly, the retracted position can be any position that retracts the actuators 104a–d back past the neutral position. In one embodiment, the actuators 104a–d are infinitely adjustable between the extended, neutral and retracted positions and can be continuously modulated during flight to optimize the flight surface position at all times during flight.

In one embodiment, the actuators 104a–d are grouped into actuator pairs. Each pair is connected to a summing lever 106a, 106b. Rather than connecting the actuators 104a–d themselves to the control surface 102, the system 100 connects the actuators 104a–d to the control surface 102 via an actuator output point 108a, 108b on the summing lever 106a, 106b. In essence, the summing lever 106a, 106b moves the control surface 102 via the actuator output point 108a, 108b according to the sum of the actuator positions. The actuator output points 108a, 108b do not act as pivot points; instead, the actuators 104a–d provide an input to the control surface 102 via the actuator output points 108a, 108b on the levers 106a, 106b attached to the actuators 104a–d. Although the illustrated embodiment shows two actuators attached to each summing lever 106a, 106b, the system 100 can incorporate any number of actuators attached to any number of summing levers.

Figure 2:
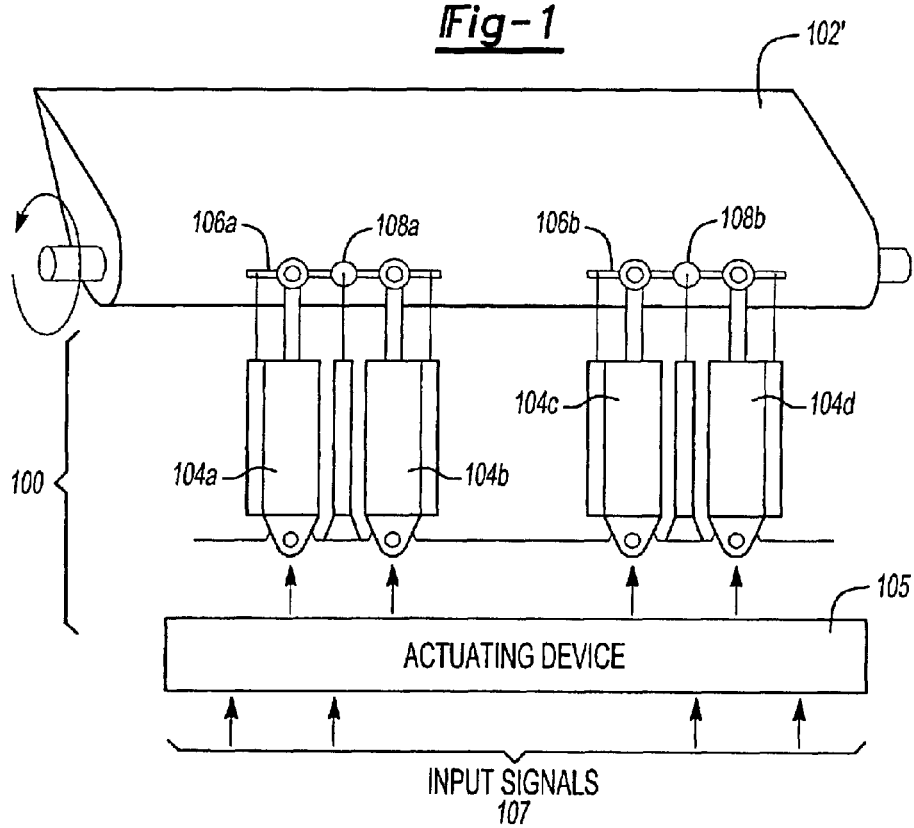
FIG. 2 is a schematic representative diagram of the system in FIG. 1 when the actuators are in an extended position.
Figure 3:
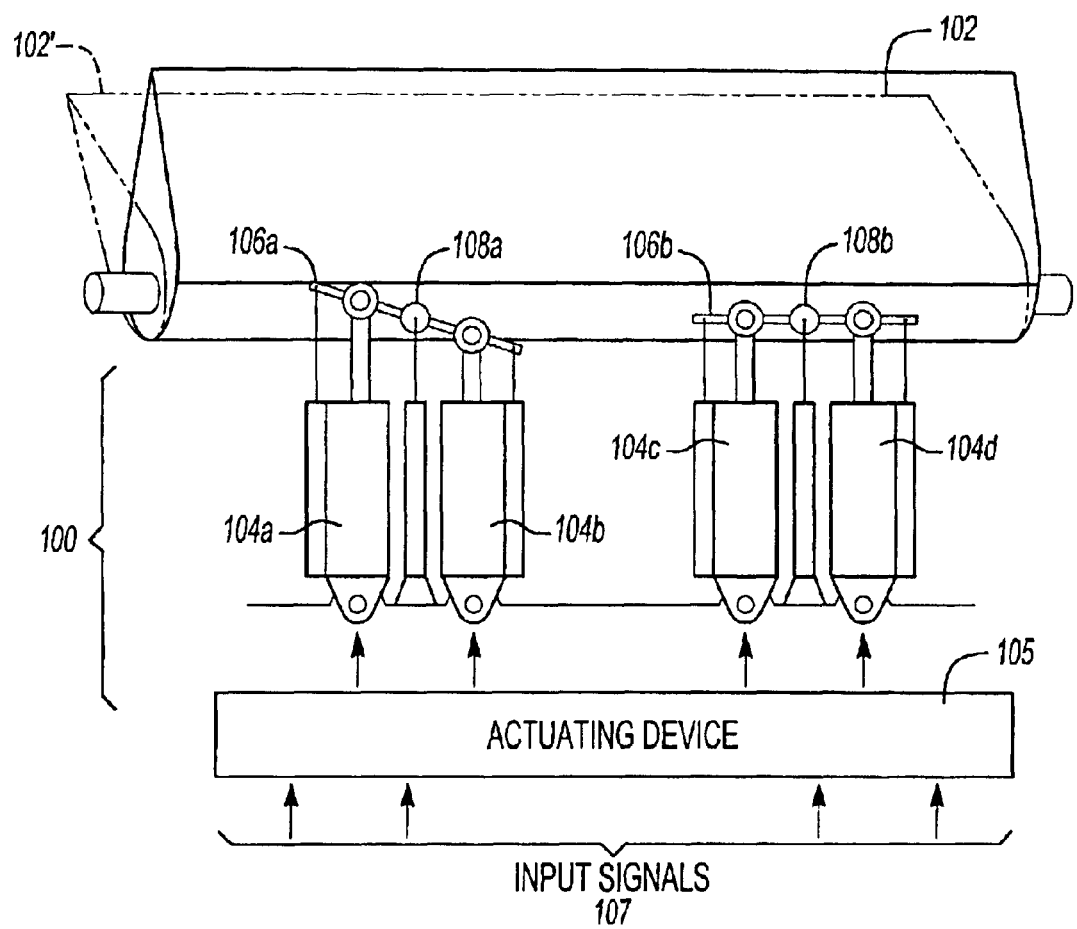
FIG. 3 is a schematic representative diagram of the system in FIG. 1 showing how the system compensates for a malfunctioning actuator that is locked in an extended position.

FIGS. 2 and 3 illustrate an example where an actuator 104a malfunctions when attempting to return the flight control surface 102 to the neutral position from the extended position. FIG. 2 illustrates an example where all of the actuators 104a–d are in an extended position, moving the flight control surface 102 to an extended position 102'. When the actuators 104a–d extend forward, they push the summing levers 106a, 106b, and therefore the actuator output points 108a–b forward as well, rotating the flight control surface 102 to the extended position 102'. This extended flight control surface position 102' may correspond to, for example, steering an aircraft.

FIG. 3 shows an example where actuators 104b–d move back while actuator 104a stays in the extended position. Actuator 104a could be locked into the extended position via a malfunction (e.g., a ham or hardover condition) or be voluntarily locked into position via an actuator brake or other actuator locking device. Actuators may be voluntarily locked or otherwise disabled to save power and/or to limit the amount of error in the flight control surface position if an actuator fails. In these cases, the locked actuator acts as a load-bearing actuator while one or more of the other actuators modulate the flight control surface position. For illustrative purposes only, the discussion below will assume that the extended actuator 104a is staying in the extended position due to a malfunction.

If the first actuator 104a locks in an extended position, as shown in FIG. 3, it would normally force the flight control surface 102 to seize in the extended position 102' if the system 100 did not contain the summing levers 106a, 106b and if the actuators 104a–d are of the type that do not contain a bypass mode. If all four actuators 104a–d were independently controllable and directly attached to the flight control surface 102, the extended position of the malfunctioning actuator 104a would make it impossible to pull the flight control surface 102 back to the neutral position because the other actuators 104b–d would not be able to dislodge the malfunctioning actuator 104a.

As shown in FIG. 3, the actuators 104c, 104d in one pair pull the summing lever 106b, and therefore its actuator output point 108b, to the neutral position. Malfunctioning actuator 104a, however, remains stuck in the extended position. By coupling multiple actuators 104a–d to a summing lever 106a–b, however, the locked position of a malfunctioning actuator can be compensated by other actuators attached to the same summing lever so that control is based on the summed position at the actuator output point and not on any individual actuator. In the illustrated example, the operational actuator 104b on the same summing lever 106a as the malfunctioning actuator 104a compensates for the extended position of the malfunctioning actuator 104a. More particularly, the operational actuator 104b pulls back past the desired neutral position to the retracted position. Because the summing lever 106a is attached to both an extended actuator 104a (the malfunctioning actuator) and a retracted actuator 106b, the summed position of the two actuators 104a, 104b sets the actuator output point 108a to the desired neutral position. This compensation may be conducted automatically via the actuation device 105 if the device 105 is programmed to detect and compensate for malfunctions without requiring additional user input. As a result, the flight control surface 102 can be returned to the neutral position despite the malfunctioning actuator's 104a inability to retract from the extended position. The sum of two actuator positions places the actuator output point 108 in a position that places the flight control surface 102 in a neutral position.

The system 100 is not limited to compensating for an actuator stuck in an extended position. The summing levers 106a, 106b enable operational actuators attached to the same summing lever as the malfunctioning actuator to compensate for jams or hardovers in any actuator position to bring the flight control surface 102 to a desired position (e.g., a neutral position), ensuring accurate control of the aircraft until the malfunctioning actuator can be serviced. In one embodiment, although the summing levers 106a, 106b may not compensate enough to restore a full range of movement for the flight control surface 102 due to a malfunction, they allow the control surface 102 to be brought to a neutral position so that it will not interfere with the effect of other flight control surfaces on the aircraft.

FIGS. 1 through 3 show a system 100 having two summing levers 106a, 106b. In one embodiment, each summing lever 106a, 106b can control the position of the flight control surface 102 by itself without any input from the other summing lever. This provides redundancy in the system 100 so that each summing lever 106a, 106b and its associated actuators 104a–d can fully control the surface 102 even if one of the actuator pairs is disconnected from the other pair. Further, providing multiple actuator pairs allows the control surface 102 load to be shared among the pairs.

As a result, the inventive structure enables a flight control surface to be returned to a neutral, safe position even if one of the actuators lock into a position other than the neutral position (e.g., a completely extended position or a completely retracted position). By summing the positions of two or more actuators together via the summing lever and then using the sum (as opposed to an individual actuator position) as an output to move the flight control surface, the locking of any single actuator into a fixed position can be compensated by other actuators attached to the same summing lever.

Even though the examples described above focus on a system using electro-mechanical actuators, the invention can incorporate actuators of any type, including hydraulic actuators, without departing from the scope of the invention. The inventive system is particularly useful for actuators that do not dislodge or cannot be disengaged if a lock up occurs to allow the actuator to move freely because the summing lever ensures that the flight control surface position is not dictated by any one actuator. Further, the relationship between the actuator position and the summing lever position can be controlled by varying the length of the summing lever and/or the position of each actuator on the summing lever with respect to the actuator output point. Also, although the above examples assume that a stroke position of the actuators and actuator output point correspond with the neutral position of the flight control surface; the neutral position can correspond with any selected position for the actuator output point.

Although a preferred embodiment of this invention has been disclosed, a worker of ordinary skill in the art would recognize that certain modifications would come within the scope of this invention. For that reason, the following claims should be studied to determine the true scope and content of this invention.

What is claimed is:

1. A system that controls a pivot position of a pivotable flight control surface, comprising:

at least two actuators;

an actuation device that controls positions of said at least two actuators; and a lever coupled to said at least two actuators, the lever having an actuator output point on the flight control surface between two of said at least two actuators to control the pivot position of the flight control surface about a pivot axis such that, a position of the actuator output point corresponds to a sum of positions of said at least two actuators.

2. The system of claim 1, wherein the actuator output point is between said at least two actuators.

3. The system of claim 1, wherein the actuator output point is at a mid-point between said at least two actuators.

4. The system of claim 1, wherein said at least two actuators includes a first actuator and a second actuator, wherein the first actuator, the second actuator, and the actuator output point are each movable between an extended position, a neutral position, and a retracted position, and wherein the actuation device controls the first actuator such that the actuator output point reaches the neutral position if the second actuator is locked in one of the extended position and the retracted position.

5. The system of claim 1, wherein said at least two actuators is a first actuator pair, wherein the lever is a first lever, and wherein the system further comprises a second lever and a second actuator pair coupled to the second lever, wherein the second lever has a second actuator output point connected to the flight control surface.

6. The system of claim 5, wherein the first lever and the second lever each support a full load applied by the flight control surface.

7. The system of claim 1, wherein said at least two actuators are selected from the group consisting of electro-mechanical actuators and hydraulic actuators.

8. A control system for an aircraft, comprising:

a flight control surface pivotable about a pivot axis;

a first lever having a first actuator output point on the flight control surface;

a second lever having a second actuator output point on the flight control surface;

first and second actuators connected to the first lever, wherein the first actuator point is disposed between the first and second actuators such that a position of the first actuator output point corresponds to a sum of positions of the first and second actuators;

third and fourth actuators connected to the second lever the second actuator point is disposed between the third and fourth actuators such that, wherein a position of the second actuator output point corresponds to a sum of positions of the third and fourth actuators; and an actuation device that controls positions of the first, second, third and fourth actuators to control a pivot position of the flight control surface.

9. The control system of claim 8, wherein at least the first actuator, the second actuator, and the first actuator output point are each movable between an extended position, a neutral position, and a retracted position, and wherein the actuator device controls the first actuator such that the actuator output point reaches the neutral position if the second actuator is locked in one of the extended position and the retracted position.

10. A method for controlling a position of a flight control surface using at least two actuators and a lever coupled to said at least two actuators, the lever having an actuator output point on the flight control surface and disposed between two of said at least two actuators, the method comprising:

controlling a position of the actuator output point based on a sum of positions of said at least two actuators; and controlling the position of the flight control surface via the position of the actuator output point.

11. The method of claim 10, wherein said at least two actuators includes a first actuator and a second actuator, wherein the first actuator, the second actuator, and the actuator output point are each movable between an extended position, a neutral position, and a retracted position, the method further comprising:

detecting if the second actuator is locked into one of the extended position and the retracted position; and controlling the first actuator such that the actuator output point reaches the neutral position.

* * * * *

UNITED STATES PATENT AND TRADEMARK OFFICE
CERTIFICATE OF CORRECTION

PATENT NO. : 6,776,376 B2
APPLICATION NO. : 10/274024
DATED : August 17, 2004
INVENTOR(S) : Collins Page 1 of 1

It is certified that error appears in the above-identified patent and that said Letters Patent is hereby corrected as shown below:

ON THE TITLE PAGE:

The Assignee should read as follows:

(73) Assignee: Hamilton Sundstrand, Windsor Locks, CT (US)

Signed and Sealed this

Twenty-fifth Day of August, 2009

David J. Kappos
*Director of the United States Patent and Trademark Office*